(12) United States Patent
Hauf

(10) Patent No.: US 11,503,843 B2
(45) Date of Patent: Nov. 22, 2022

(54) ANIMAL FEED FORMED MEAT COMPOSITION WITH PREY ANIMAL NUTRIMENT AND PROCESS FOR PRODUCING AN ANIMAL FEED FORMED MEAT SLUG WITH PREY ANIMAL NUTRIMENT

(71) Applicant: Reiner Hauf, Madrid (ES)

(72) Inventor: Reiner Hauf, Madrid (ES)

( * ) Notice: Subject to any disclaimer, the term of this patent is extended or adjusted under 35 U.S.C. 154(b) by 473 days.

(21) Appl. No.: 16/636,050

(22) PCT Filed: Aug. 4, 2017

(86) PCT No.: PCT/DE2017/100663
§ 371 (c)(1),
(2) Date: Feb. 3, 2020

(87) PCT Pub. No.: WO2019/024952
PCT Pub. Date: Feb. 7, 2019

(65) Prior Publication Data
US 2020/0305463 A1  Oct. 1, 2020

(51) Int. Cl.
| | |
|---|---|
| *A23K 10/20* | (2016.01) |
| *A23K 10/30* | (2016.01) |
| *A23K 20/105* | (2016.01) |
| *A23K 20/22* | (2016.01) |
| *A23K 50/42* | (2016.01) |
| *A23K 10/35* | (2016.01) |
| *A23K 20/10* | (2016.01) |
| *A23L 13/00* | (2016.01) |
| *A23L 13/40* | (2016.01) |
| *A23L 13/50* | (2016.01) |
| *A23L 13/60* | (2016.01) |
| *A23K 50/40* | (2016.01) |
| *A23K 40/20* | (2016.01) |
| *B65D 85/00* | (2006.01) |

(52) U.S. Cl.
CPC .............. *A23K 10/20* (2016.05); *A23K 10/30* (2016.05); *A23K 20/105* (2016.05); *A23K 20/22* (2016.05); *A23K 40/20* (2016.05); *A23K 50/42* (2016.05); *B65D 85/70* (2013.01)

(58) Field of Classification Search
CPC ...... A23K 10/20; A23K 10/30; A23K 20/105; A23K 20/22; A23K 40/20; A23K 50/42; A23K 10/35; A23K 20/10; A23K 50/40; B65D 85/70; A23L 13/03; A23L 13/428; A23L 13/52; A23L 13/67; A23L 13/424
See application file for complete search history.

(56) References Cited

U.S. PATENT DOCUMENTS

| | | | |
|---|---|---|---|
| 2006/0062892 | A1 | 3/2006 | Merrick |
| 2009/0068316 | A1* | 3/2009 | Phelps ............... A23K 20/20 426/243 |
| 2012/0034348 | A1 | 2/2012 | Bennie, Jr. |
| 2013/0029011 | A1 | 1/2013 | Carrilo et al. |
| 2014/0255553 | A1 | 9/2014 | Xu |

FOREIGN PATENT DOCUMENTS

CN          201097599 Y       8/2008

* cited by examiner

Primary Examiner — Trevor Love
(74) Attorney, Agent, or Firm — Mark M. Friedman

(57) ABSTRACT

Proposed is a formed meat composition comprising additives, a process for producing a formed meat slug and a combined meat/formed meat slug. It is a disadvantage of established dried formed meat compositions that they require stabilizing desiccants and/or have an unnatural, open-pored fine structure. The novel solution proposed is a formed meat composition which, in addition to prey animal meat, glycerol and salt, merely contains additives in the form of prey animal nutriment. Also proposed is a process for producing a formed meat slug in which a common comminution of meat and additives in a manner modelled on hunting is carried out. Finally proposed is a combined meat/formed meat slug which comprises in its primary constituents only animal meat ingredients and the recited additives. The claimed subject matter provides the particular advantage that, despite additives, a denser, more stable and closed fine structure is achieved.

3 Claims, No Drawings

ANIMAL FEED FORMED MEAT COMPOSITION WITH PREY ANIMAL NUTRIMENT AND PROCESS FOR PRODUCING AN ANIMAL FEED FORMED MEAT SLUG WITH PREY ANIMAL NUTRIMENT

TECHNICAL FIELD

The present invention relates to an animal feed formed meat composition with added prey animal nutriment according to the preamble of the independent claims, to a process for producing a formed meat slug from said composition, to a combined meat/formed meat slug comprising the formed meat slug from the process, and to retail packs containing said formed meat slug or the combined meat/formed meat slug.

The fundamental technical field can be described by the umbrella term 'animal nutrition' or else 'animal snacks'. The applicant has been working in this field for a prolonged period. Established, advantageous measures, features and terminology can be found, for example, in the documents WO 2016 180 405 A1 and DE 10 2015 107 344 A1, and the documents cited and searched for therein.

DESCRIPTION OF THE PRIOR ART

Specifically, the present invention is in the field of meat-based animal feed slugs, preferably dog food slugs, with additions. 'Additions' here are secondary constituents of a different type that are present at 1 to 49 percent by weight, preferably 2 to 40 percent by weight, more preferably in each case 5 to 10 percent by weight, with an accuracy of +−2 percent by weight and a total of not more than 40 percent by weight, while the main constituent consists of meat. This fundamental definition defines animal feed slugs of the generic type in the context of the present invention.

WO 99/22604 A1 proposes enriching animal feed having a high protein content with dietary fiber-rich additions, especially with sugar beet pulp or ground endive fibers or cellulose pulp. The fundamentally meat-based feed mixture should preferably be boiled and may also be made up with purely vegetable proteins as the main constituent. A disadvantage here is that boiled nutriment and additions in finely dispersed pulp form are not in accordance with the natural food of hunting animals, preferably dogs: specifically smaller prey animals, for example Phasianidae or rodents or mice, which, being omnivores, make use of all physiologically compatible food sources, reduce their predominantly plant-based food to smaller pieces only coarsely. The hunting animal, by contrast, eats such prey animals whole—possibly after a short chewing process. Therefore, hunting animals—especially dogs—are fed essentially on meat with an ever-present proportion of plant-based additions. However, these additions are neither boiled nor ultrafinely pureed. At most, they are coarsely reduced to smaller pieces together with the prey animal. Only in the case of very much larger prey animals does a predator possibly receive a larger stomach with its contents. In each case, the meat is present as a whole and has not been preparatively cooked, dispersed or ultrafinely coupled to proteins with emulsifiers. Moreover, soft feeds that have been modified with binders are frequently extended with ice during production, which is then removed again at elevated temperature to the extent to which the binder cannot incorporate the ice. The result is lightweight, open-pore soft feed slugs. As a result of the high moisture content, these frequently have a tendency to rapidly become bacterially contaminated and disadvantageously have to be combined under protective gas or with a desiccant in order to assure a minimum shelf life necessary for commercial sale. Specifically in the case of silica gel desiccants that are frequently added in the form of ceramic beads in a paper pack open to diffusion, there is disadvantageously the risk that these take on the odor of the feed in friction contact and are therefore inadvertently consumed by a dog. Furthermore, specifically technically prepared and preprocessed soft feeds are problematic: dogs have a tendency to bolt down excessively soft feed slugs directly and in excessive amounts, which promotes obesity. Moreover, the soft feed promotes tooth diseases since there is thus no natural chewing process that could clean the teeth at least superficially in friction contact. Established measures for solidifying such slugs, for example the addition of wheat flour, corn starch or alginates, are capable of restoring a meaty texture only to a moderate degree. It is incomprehensible here to the inventors why the need that has existed for many years for a balanced, natural food composition of long shelf life has so long remained uncatered for.

It was therefore an object of the present invention to overcome the disadvantages of the prior art, to cater for the obvious need, and to provide a corresponding animal feed formed meat composition with added prey animal nutriment, a process for producing a corresponding formed meat slug with added prey animal nutriment, and a combined meat/formed meat slug comprising the formed meat slug from the process with added prey animal nutriment.

This object is achieved according to the features of the independent claims in the form of a formed meat composition, a process for producing a formed meat slug, and a combined meat/formed meat slug. Advantageous embodiments will be apparent from the dependent claims and the description that follows. Additional, advantageous features and measures as known in the art and in the technical field—if they are not directly at odds with the teaching of the invention—may form part of the subject matter claimed in the present context without leaving the scope of the invention.

SUMMARY OF THE INVENTION

The animal feed formed meat composition of the invention with added prey animal nutriment consists of the following components: 45 to 100 parts by weight of chopped prey animal meat, 0.1 to 20 parts by weight of salt, 0.01 to 10 parts by weight of glycerol, 5 to 40, preferably 5 to 10, parts by weight with an accuracy of +−2 parts by weight and a total of not more than 40 parts by weight of at least one type of prey animal nutriment chopped together with the prey animal meat, and up to 5 parts by weight of adjusters and auxiliaries and substances that unavoidably accompany the components.

The process of the invention for producing a formed meat slug from a raw mixture of the above-described composition comprises the steps of a) coarsely comminuting prey animal nutriment types at room temperature, b) intimately blending with coarsely comminuted, frozen prey animal meat until there is a homogeneous mixture at −20° C., c1) chopping the mixture at −20° C. with c2) addition of exclusively glycerol and salt, wherein c3) the temperature is controlled to a maximum value of −8° C. until c4) a homogeneous, spreadable mixture has been obtained and d1) shaping a formed meat slug in the form of a slice from the mixture, wherein d2) the layer thickness of the finished formed meat slug formed in a flat, two-dimensional profile is 0.1 centimeter to 2 centimeters and the temperature of the mixture does not exceed −5° C.

A meat/formed meat slug of the invention is obtained by pressing deboned meat of an appropriate prey animal type in coarse pieces into a tubular profile, freezing it and cutting it into meat slices with an essentially congruent profile, where the thickness of the flat meat slices at least −4° C. is 0.1 to 1 centimeter, and the meat slices are combined with the above-described formed meat slug according to the process steps of: e) placing at least one meat slice congruently onto at least one formed meat slug, f) placing the combined meat/formed meat slug onto a grid and g) air drying at a temperature of not more than −2° C.

The formed meat slugs obtainable in accordance with the invention and also combined meat/formed meat slugs, in spite of plant-based additions, surprisingly have a longer shelf life and are more resistant to chewing and biting than technically preprocessed, established, meat-based competitor products. Even in retail form and in loose outer packing, they do not require any disadvantageous protective gases, desiccants or antioxidants, in order to be able to reliably give 6 to 12 months of shelf life. Therefore, retail packs of the invention advantageously consist of simple bags sealed airtight, into which the products of the invention are introduced in a loose bed.

DESCRIPTION OF THE INVENTION AND ADVANTAGEOUS FEATURES

An animal feed formed meat composition of the invention with added prey animal nutriment serves as a basis for formable raw mixtures. It is essential that the animal feed formed meat composition is constructed without addition of binders or extenders and as close to nature as possible. Particularly the degree of comminution and the composition of the core components are oriented here to the natural food intake of an *omnivore*, preferably a dog. The core components are 45 to 100 parts by weight of chopped prey animal meat. 0.1 to 20 parts by weight consist of salt. Higher salt contents may reflect, for example, seawater-based or salt-rich regional feeding scenarios. 0.01 to 10 parts by weight of glycerol adjust the moisture content of the mixture such that the superficial moisture contents are similar to those of fresh prey animal meat including the prey animal stomach. As an addition to the main meat component, 5 to 40, preferably 5 to 10, parts by weight with an accuracy of +−2 parts by weight and a total of not more than 40 parts by weight of at least one type of prey animal nutriment chopped together with the prey animal meat are added to the animal feed formed meat composition. Up to parts by weight of adjusters and auxiliaries and substances that unavoidably accompany the components are also present. The common mechanical comminution by cutting and shearing forces in a chopper here reflects the chewing process of the hunting animal, preferably dog. The inventors assume that the common comminution and breakup of meat cells and prey animal food types results in a much more realistic overall mixture for a hunting animal. The mixture obtained by common chopping is visually homogeneous, similar to a fine sausage meat, and, according to the structure content of the prey animal nutriment, shows visually identifiable components: structures with elevated stability such as stable peel segments of tomatoes/blueberries or else carrot segments are still apparent in the composition in thin, folded but coherent segments of 1 to 10 millimeters in size, while soft nutriment of a prey animal, for example red beetroot, apple or kale, is dispersed so as to be no longer visually identifiable. Therefore, the composition claimed in the present context, in terms of texture, appearance and structure, reflects coarse to fine precomminution appropriate for a prey animal nutriment.

Preferably, in the animal feed formed meat composition, the prey animal nutriment types consist of plant-based nutriment types. Specifically in the case of smaller prey animals such as rodents or Phasianidae up to and including geese, eating behavior is frequently directed predominantly to plant-based food sources.

Preferably, there is at least one prey animal nutriment type in the animal feed formed meat composition that is selected from the group consisting of apple, pear, plum, cranberry, blueberry, kale, sweet potato, carrot, gooseberry, currant, red beetroot, bilberry, ginger, curcuma, mustard seeds, tomato, cucumber, pumpkin, lettuce, grass, seeds.

A process for producing a formed meat slug with added prey animal nutriment from a mixture in the context of the present invention comprises the steps of a) coarsely comminuting prey animal nutriment types at room temperature; 'coarsely' here reflects the eating behavior of the prey animals. The addition is therefore preferably comminuted beforehand to below 1 cm to 0.1 mm. Such chips, lumps or powders are preferably used as addition;

b) intimately blending with coarsely comminuted, frozen prey animal meat until there is a homogeneous mixture at −20° C.;

preference is given to using meat in frozen, centimeter-sized, deboned segments. These are advantageously simple deboned body segments of the respective prey animal. Deliberately dispensing with preblended fiber and tissue mixtures, or those obtained unnaturally by separator, preferably makes it possible here to obtain a structure and texture of improved closeness to reality;

c1) chopping the mixture at −20° C. with c2) addition of exclusively glycerol and salt, wherein c3) the temperature is controlled to a maximum value of −8° C. until c4) a homogeneous, spreadable mixture has been obtained; the common chopping ensures improved, intimate contact of the components; the inventors assume that the regulation to a temperature well below 0° C. in the individual particles in combination with glycerol and salt advantageously at first brings about partial thawing along the contact surfaces, while the core segments of the particles remain frozen. This may explain why the chopped mixture has improved firmness coupled with good flowability. The hard, frozen core segments mechanically stabilize the fine structure of the mixture, while the partially thawed edge segments can be more intimately mixed and bonded later on.

d1) shaping a formed meat slug in the form of a slice from the mixture, wherein d2) the layer thickness of the finished formed meat slug formed in a flat, two-dimensional profile is 0.1 centimeter to 2 centimeters and the temperature of the mixture does not exceed −5° C.

The formed meat slug is surprisingly precisely formable and dimensionally stable. This advantageously enables more exact specification of the nutritional value per slug, and further processing with improved accuracy.

The process according to preferably includes the step of placing the formed meat slug on a grid and drying it in an air stream at a temperature of not more than −2° C. The above-described fine structure can explain the advantageously reduced sinking of the slug into the grid support: slugs according to the prior art have a more significant tendency to flow away and flow in and, after drying in the same way, have a more deeply indented negative profile of the grid support.

The process is preferably characterized in that, in parallel with the production of a formed meat slug, deboned meat of an appropriate prey animal type in coarse pieces is pressed into a tubular profile, frozen and cut into meat slices with an essentially congruent profile, where the thickness of the flat meat slices at least −4° C. is 0.1 to 1 centimeter. More preferably, specifically in the case of larger prey animals, simple meat from the muscle and tissue region is used. The meat slices thus obtained are advantageously introduced in the process according to the invention via the process steps of e) placing at least one meat slice congruently onto at least one formed meat slug,
f) placing the combined meat/formed meat slug onto a grid
g) air drying at a temperature of not more than −2° C.;
in spite of the elevated areal pressure, the slugs do not sink any deeper into the supporting grid. Furthermore, the inventors assume that, in two-dimensional contact, the glycerol incorporated beforehand and distributed over the surface, in combination with the salt, results in gradual surface thawing, drying and setting.

The inventors attributed this to the tensile strength of the formed meat slug and also the tensile strength in combination with the meat slice after drying being distinctly higher than is the case in established and/or competitor products. Against this background, the present invention is directed both to a formed meat slug from the process and to a combined meat/formed meat slug.

Preferably, the meat/formed meat slug consists of a dried combination of a meat slice on a formed meat slug, where the thickness of the meat slice is not more than 70% of the layer thickness of the formed meat slice.

The measures in the process can give a reasonable explanation of the denser, more stable texture, elevated tensile strength and bite resistance, and also improved shelf life: a smoother, more uniform surface and a denser, more compact fine structure slow down the ingress of moisture and bacteria considerably. This can give a reasonable explanation as to why the products of the invention had equal to superior storage times without additional protective gases, antioxidants or desiccants. Against this background, the present invention also claims a retail pack containing a multitude of formed meat slugs from the process and/or meat/formed meat slugs, wherein the retail pack consists solely of an encasing plastic sleeve that has optionally been printed and has been sealed airtight and contains solely the respective dried slugs in a loose bed.

Further advantages are apparent from the working examples. It will be apparent that the above-described preferred features, advantages and working examples hereinafter should not be considered in a restrictive manner. Advantageous or preferred additional features and additional combinations of features as elucidated in the description, within the scope of the independent claims, can be implemented in the subject matter claimed either individually or in varying combinations thereof without leaving the scope of the invention.

DETAILED ELUCIDATION OF THE INVENTION WITH REFERENCE TO WORKING EXAMPLES

In an advantageous embodiment, an animal feed formed meat composition is made up with addition of prey animal nutriment as a formable raw mixture, wherein the formed meat composition consists of the following components: 45 to 100 parts by weight of chopped, deboned animal chicken meat, 0.1 to 20 parts by weight of salt, 0.01 to 10 parts by weight of glycerol, 5 to 10 parts by weight with an accuracy of +−2 parts by weight and a total of not more than 40 parts by weight of at least two types of plant-based prey animal nutriment chopped together with the prey animal meat, comprising at least apple and kale to an extent of at least 8 and at most 11.5 parts by weight, and up to 5 parts by weight of adjusters and auxiliaries and substances that unavoidably accompany the components.

For this purpose, 5 parts by weight of apple slices and 3 parts by weight of pear slices are coarsely comminuted in a step a) at room temperature. Subsequently, the production consists of the steps of: b) intimately blending with coarsely comminuted, frozen chicken meat comprising chicken hearts and deboned chicken muscle meat until there is a homogeneous mixture at −20° C., c1) chopping the mixture at −20° C. with c2) addition of exclusively glycerol and salt, wherein c3) the temperature is controlled to a maximum value of −8° C. until c4) a homogeneous, spreadable mixture has been obtained and d1) shaping a formed meat slug in the form of a slice from the mixture, wherein d2) the layer thickness of the finished formed meat slug formed in a flat, two-dimensional profile is 0.5 centimeter+−0.1 and the temperature of the mixture does not exceed −5° C.

In parallel, deboned chicken meat in coarse breast fillet pieces was pressed into a tubular profile, frozen and cut into meat slices having an essentially congruent profile, wherein the thickness of the flat meat slices, likewise at at least −4° C., is 0.15 centimeter+−0.1 centimeter, and the meat slices were used in the following method steps: e) placing at least one meat slice congruently onto at least one formed meat slug, f) placing the combined meat/formed meat slug onto a grid, g) air drying at a temperature of not more than −2° C.

The combined meat/formed meat slug thus obtained therefore consisted of a dried combination of a meat slice on a formed meat slug. The droplet-shaped slices of the meat/formed meat slugs and of the formed meat slugs had a maximum width of 4.5 cm and a length of 11 cm. Using a scalpel, specimens of width 1 cm and 2 cm (+−2 mm) and length 8 cm (+−1 mm) were cut out of these (test specimens I).

Test specimens of the same dimensions were divided from competitor products in the same way; the competitor products were formed meat slugs that had been dried in the same way with the following weight compositions: a) lamb meat (at least 90%), corn starch, glycerol; b) beef (at least 90%), corn starch, glycerol; c) duck (at least 90%), corn starch, glycerol. A common factor to all the comparative products is that they have been supplied with an additional desiccant in a retail pack with an airtight seal.

The above-described test specimens were clamped at 23° C. (+−2° C.) and 50% relative air humidity (+−10%) into a measuring instrument for tensile, shear and pressure tests. Enclosed material strips of length 77 mm were clamped here between two fixing clamps; the clamps were moved apart at 100 mm per minute, while the force needed for the purpose was recorded continuously.

In addition, storage under air was undertaken to constant mass (test specimens II; air-moist); in addition, insalivation was simulated by placing test specimens in distilled water (series a) and in synthetic saliva (series b) for 0.5 h (test specimens III)/1.5 h (test specimens IV)/5 h (test specimens V), and the tests were repeated as described above on the test specimens thus conditioned.

The comparative specimens all have a lower tensile strength, swell more quickly while placed in liquids and lose considerably more mechanical strength as a result of the soaking/placing in liquids.

The inventors assume that the open-pore fine structure and lower uniformity of the established formed meat slugs are responsible for the poorer mechanical properties and reduced shelf life. The presently claimed composition, by virtue of the novel process, makes it possible to obtain a more versatile, more stable dog food snack with a longer shelf life.

INDUSTRIAL APPLICABILITY

What are proposed are a formed meat composition with additions, a process for producing a formed meat slug and a combined meat/formed meat slug. Disadvantageously, established dried formed meat compositions require stabilizing desiccants and/or have an unnatural, open-pore fine structure.

What is proposed for the first time as a solution is a formed meat composition containing, as well as prey animal meat, glycerol and salt, merely additions in the form of prey animal nutriment. Also proposed is a process for producing a formed meat slug in which there is common comminution, simulating the hunting situation, of meat and addition. Finally proposed is a combined meat/formed meat slug including solely animal-based meat ingredients and said additions in its main constituents.

The subject matter claimed offers the particular advantage that, in spite of additions, a denser, more stable and continuous fine structure is achieved. This is associated with elevated mechanical strength, sustained moisture resistance and improved shelf life. Desiccants thus become unnecessary for the retail packs.

The invention claimed is:

1. A process for producing a formed meat slug with added prey animal nutriment, for formable raw mixtures, characterized in that the formed meat slug with added prey animal nutriment consists of the following components:

45 to 100 parts by weight of chopped prey animal meat,
0.1 to 20 parts by weight of salt,
0.01 to 10 parts by weight of glycerol,
5 to 40 parts by weight with an accuracy of +/−2 parts by weight and a total of not more than 40 parts by weight of at least one type of prey animal nutriment chopped together with the prey animal meat, and
up to 5 parts by weight of adjusters and auxiliaries and substances that unavoidably accompany the components, wherein the process comprises the steps of
a) coarsely comminuting prey animal nutriment types at room temperature
b) intimately blending with coarsely comminuted, frozen prey animal meat until there is a homogeneous mixture at −20° C.
c1) chopping the mixture at −20° C. with
c2) addition of exclusively glycerol and salt, wherein
c3) the temperature is controlled to a maximum value of −8° C. until
c4) a homogeneous, spreadable mixture has been obtained and
d1) shaping a formed meat slug in the form of a slice from the mixture, wherein
d2) the layer thickness of the finished formed meat slug formed in a flat, two-dimensional profile is 0.1 centimeter to 2 centimeters and the temperature of the mixture does not exceed −5° C.

2. The process as claimed in claim 1, characterized in that formed meat slug is placed on a grid and dried in an air stream at a temperature of not more than −2° C.

3. The process as claimed in claim 1, characterized in that, in parallel with the production of a formed meat slug, deboned meat of an appropriate prey animal type in coarse pieces is pressed into a tubular profile, frozen and cut into meat slices with an essentially congruent profile, where the thickness of the flat meat slices at at least −4° C. is 0.1 to 1 centimeter, and the meat slices are used according to the process steps of:
e) placing at least one meat slice congruently onto at least one formed meat slug,
f) placing the combined meat/formed meat slug onto a grid
g) air drying at a temperature of not more than −2° C.

* * * * *